(12) United States Patent
Kristensson et al.

(10) Patent No.: US 7,912,444 B2
(45) Date of Patent: Mar. 22, 2011

(54) MEDIA PORTION SELECTION SYSTEM AND METHOD

(75) Inventors: Andreas Kristensson, Lund (SE); Pär-Anders Aronsson, Klagshamn (SE)

(73) Assignee: Sony Ericsson Mobile Communications AB, Lund (SE)

( * ) Notice: Subject to any disclaimer, the term of this patent is extended or adjusted under 35 U.S.C. 154(b) by 922 days.

(21) Appl. No.: 11/738,690

(22) Filed: Apr. 23, 2007

(65) Prior Publication Data
US 2008/0263046 A1    Oct. 23, 2008

(51) Int. Cl.
*H04M 9/00* (2006.01)
*H04M 3/42* (2006.01)

(52) U.S. Cl. ........................................ 455/401; 455/415

(58) Field of Classification Search .................. 455/415, 455/445, 462, 418, 419, 414.1, 575, 344, 455/351, 556, 557, 150.1, 41.3, 569.2, 3.01, 455/566, 556.2, 553.1, 574, 517, 681, 67.11, 455/66.1, 345, 352.3, 404.2, 567; 379/218.01, 379/211.01; 370/310, 340, 352, 487; 700/94, 700/6, 83; 710/63, 64; 707/9, E17.048
See application file for complete search history.

(56) References Cited

U.S. PATENT DOCUMENTS

| | | | | |
|---|---|---|---|---|
| 5,987,525 A * | 11/1999 | Roberts et al. | ................ | 709/248 |
| 6,055,508 A * | 4/2000 | Naor et al. | ....................... | 705/11 |
| 6,061,680 A * | 5/2000 | Scherf et al. | .......................... | 1/1 |
| 6,154,773 A * | 11/2000 | Roberts et al. | ................ | 709/219 |
| 6,230,192 B1 * | 5/2001 | Roberts et al. | ................ | 709/217 |
| 6,230,207 B1 * | 5/2001 | Roberts et al. | ................ | 709/236 |
| 6,240,456 B1 * | 5/2001 | Teng et al. | ..................... | 709/230 |
| 6,304,523 B1 * | 10/2001 | Jones et al. | ..................... | 700/88 |
| 6,330,593 B1 * | 12/2001 | Roberts et al. | ................ | 709/217 |
| 7,065,342 B1 | 6/2006 | Rolf | | |
| 7,415,195 B2 * | 8/2008 | Ando et al. | ................... | 386/248 |
| 7,685,132 B2 * | 3/2010 | Hyman | ................... | 707/999.01 |
| 2002/0138641 A1 * | 9/2002 | Taylor et al. | .................. | 709/231 |
| 2002/0160816 A1 * | 10/2002 | Vitallo et al. | ................. | 455/566 |
| 2003/0061385 A1 * | 3/2003 | Gonze | .......................... | 709/246 |
| 2003/0093793 A1 * | 5/2003 | Gutta | ............................. | 725/46 |
| 2003/0149612 A1 * | 8/2003 | Berghofer et al. | .............. | 705/10 |
| 2005/0026661 A1 | 2/2005 | Rheenen et al. | | |
| 2005/0170865 A1 | 8/2005 | Harvej et al. | | |
| 2005/0193002 A1 * | 9/2005 | Souders et al. | ........... | 707/103 X |
| 2005/0239396 A1 * | 10/2005 | Kreifeldt et al. | ............. | 455/3.01 |

(Continued)

FOREIGN PATENT DOCUMENTS

EP    1 826 994 A2    8/2007

(Continued)

OTHER PUBLICATIONS

International Search Report and Written Opinion dated Apr. 10, 2008 issued in corresponding PCT application No. PCT/IB2007/054286, 15 pages.

(Continued)

*Primary Examiner* — Melody Mehrpour (74) *Attorney, Agent, or Firm* — Harrity & Harrity, LLP (57) ABSTRACT

A device may store a media file. A portion of the media file may be identified and played back in response to an event associated with the device. In one implementation, a portion of an existing audio file may be used as a ring tone in response to a received incoming telephone call.

20 Claims, 7 Drawing Sheets

U.S. PATENT DOCUMENTS

| | | | |
|---|---|---|---|
| 2006/0020662 A1* | 1/2006 | Robinson | 709/203 |
| 2006/0046778 A1* | 3/2006 | Hembree | 455/557 |
| 2006/0092982 A1* | 5/2006 | Hu | 370/487 |
| 2006/0143236 A1* | 6/2006 | Wu | 707/104.1 |
| 2007/0072593 A1* | 3/2007 | Huliyapur Math | 455/415 |
| 2007/0099604 A1 | 5/2007 | Shanahan | |
| 2007/0136761 A1* | 6/2007 | Basmajian et al. | 725/62 |
| 2007/0233740 A1* | 10/2007 | Nichols et al. | 707/104.1 |
| 2008/0220825 A1* | 9/2008 | Wu | 455/569.1 |
| 2008/0254785 A1* | 10/2008 | Lazaridis et al. | 455/419 |
| 2009/0054092 A1* | 2/2009 | Stonefield et al. | 455/466 |
| 2009/0286560 A1* | 11/2009 | Willis | 455/466 |

FOREIGN PATENT DOCUMENTS

| | | |
|---|---|---|
| WO | WO 2006/037850 A1 | 4/2006 |
| WO | WO 2007/046885 A1 | 4/2007 |

OTHER PUBLICATIONS

M. Goto, "SmartMusicKIOSK: Music Listening Station with Chorus-Search Function", 147th ASA Meeting, New York, NY, National Institute of Advanced Industrial Science and Technology (AIST), presented May 25, 2004, pp. 1-7.

* cited by examiner

MEDIA PORTION SELECTION SYSTEM AND METHOD

TECHNICAL FIELD OF THE INVENTION

The invention relates generally to the operation of mobile communication devices and, more particularly, to systems and methods for selecting and implementing media selections in mobile communication devices.

DESCRIPTION OF RELATED ART

Mobile communication devices and other electronic devices, such as cellular telephones and personal media players have become increasingly versatile. Audio and visual alerts associated with such devices, such as ring tones, background wallpapers, alert sounds, etc. are typically provided with the device or may be obtained from the service provider associated with the device for a fee. Alternatively, such display and alert elements may be manually created and edited on additional user devices, such as personal computers, and uploaded to the mobile device for subsequent use. Often, service providers and/or device manufacturers limit the ability of users to generate personalized alert and/or audio image/video.

SUMMARY

According to one aspect, a method may include identifying a portion of an existing media file in a mobile communications device; receiving an incoming call; and playing back the identified portion of the existing media file in response to the received incoming call.

Additionally, the identified portion of the existing media file may include a starting time identification and an ending time identification.

Additionally, the identified portion may include one of a starting time identification or an ending time identification.

Additionally, the existing media file may include a digital rights managed media file.

Additionally, the existing media file may be protected by digital rights management.

Additionally, the existing media file may include one of an audio file, a video file, an animation file, or a multimedia file.

Additionally, identifying a portion of an existing media file in a mobile communications device may include automatically identifying an identifiable portion of the existing media file.

Additionally, the identifiable portion of the existing media file may include a chorus portion of the existing media file.

Another aspect is directed to a method including identifying a portion of an existing media file. The identified portion may be assigned to an action. The identified portion of the existing media file may be played back in accordance with the assigned action.

Additionally, the action may include one of: receipt of an incoming call, receipt of an incoming message, execution of an alert, execution of a reminder, display of a background, display of a screensaver, or display of a caller identification element.

Additionally, identifying a portion of an existing media file may further include identifying a starting time within the existing media file; and identifying an ending time within the existing media file.

Additionally, identifying a portion of an existing media file may further include: automatically determining an identifiable portion of the existing media file; setting a starting time for the portion of the existing media file to a starting time of the automatically determined identifiable portion; and setting a ending time for the portion of the existing media file to an ending time of the automatically determined identifiable portion.

Additionally, the method may include receiving adjustments to one of the starting time for the portion of the existing media file or the ending time for the portion of the existing media file.

Another aspect is directed to a mobile device. The mobile device may include a display; a speaker; a memory for storing an existing media file; first logic configured to identify a portion of the existing media file; second logic configured to assign the identified portion to performance of an action associated with the mobile device; and third logic configured to output the identified portion of the existing media file via at least one of the display or the speaker in response to an executed command.

Additionally, the first logic may be further configured to output a representation of the identified portion of the existing media file to the display.

Additionally, the first logic may be further configured to receive adjustments to the identified portion of the existing media file.

Additionally, the action may include a ring tone playback command generated in response to a received call.

Additionally, the action may include a message alert playback command generated in response to a received message.

Additionally, the mobile device may include a portable communications device.

Another aspect is directed to a portable communications device. The portable communications device may include means for outputting audio and video; means for storing a media file; means for identifying a portion of the stored media file; means for assigning the identified portion to an event; and means for outputting the identified portion of the stored media file in response to the assigned event.

Additionally, the identified portion of the stored media file may include less than an entirety of the stored media file.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary Electronic Device

Figure 1:
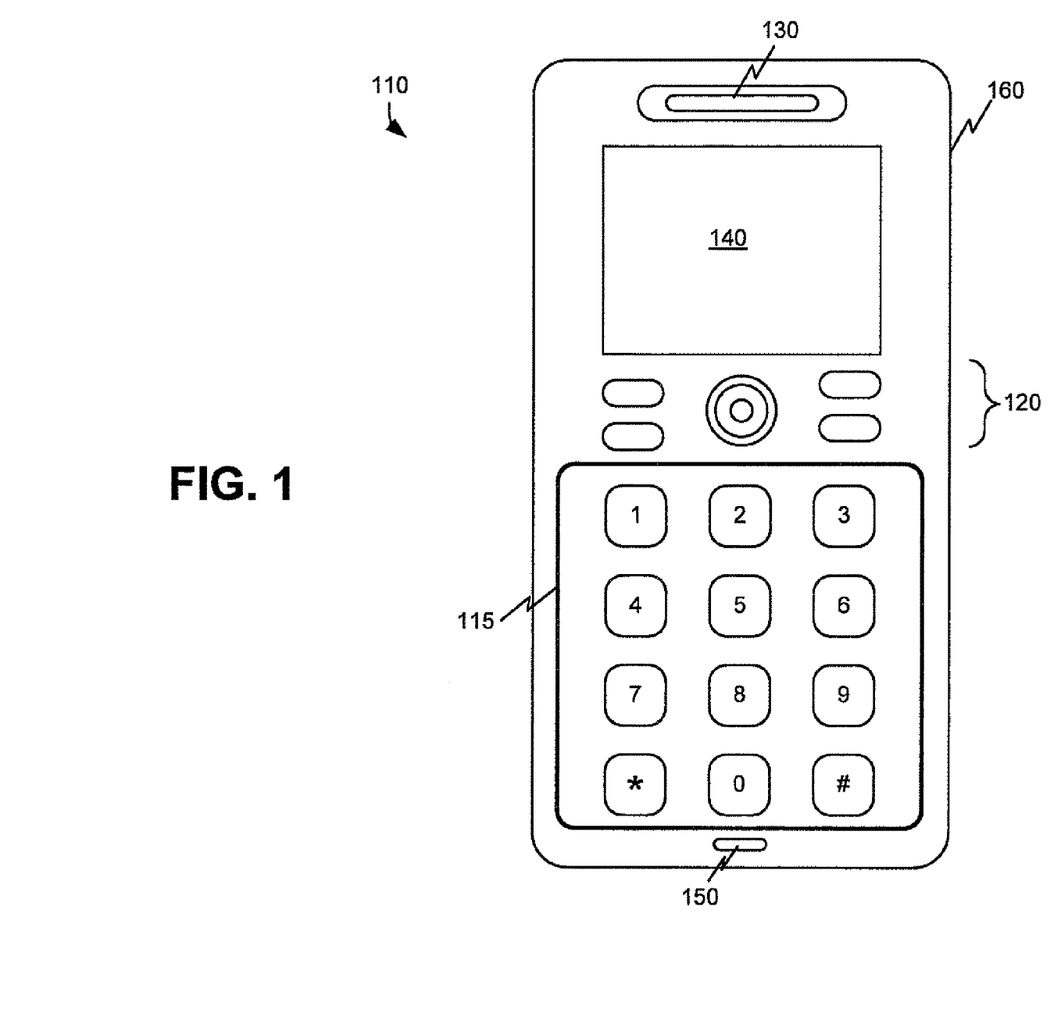
FIG. 1 is a diagram of an exemplary mobile terminal.

FIG. 1 is a diagram of an exemplary implementation of a device consistent with the invention. The device can be any type of portable electronic device. The device will particularly be described herein as a mobile terminal 110 that may include a radiotelephone or a personal communications system (PCS) terminal that may combine a cellular radiotelephone with data processing, a facsimile, and/or data communications capabilities. It should be understood that the various aspects described herein may be implemented in a variety of electronic devices, such as portable media players, personal digital assistants (PDAs), smartphones, etc.

Mobile terminal 110 may include housing 160, keypad 115, control keys 120, speaker 130, display 140, and microphone 150. Housing 160 may include a structure configured to hold devices and components used in mobile terminal 110. For example, housing 160 may be formed from plastic, metal, or composite and may be configured to support keypad 115, control keys 120, speaker 130, display 140 and microphone 150.

Keypad 115 may include devices and/or logic that can be used to operate mobile terminal 110. Keypad 115 may further be adapted to receive user inputs, directly or via other devices, such as via a stylus for entering information into mobile terminal 110. In one implementation, communication functions of mobile terminal 110 may be controlled by activating keys in keypad 115. The keys may have key information associated therewith, such as numbers, letters, symbols, etc. The user may use keypad 115 to place calls, enter digits, commands, and text messages, into mobile terminal 110. Designated functions of keys may operate media player functionality on mobile terminal 110.

Control keys 120 may include buttons that permit a user to interact with communication device 110 to cause communication device 110 to perform specified actions, such as to interact with display 140, etc. For example, user manipulation of control keys 120 may cause elements of a user interface provided on display 140 to be highlighted or selected, thereby enabling subsequent interaction with the selected element or elements.

Speaker 130 may include a device that provides audible information or alerts to a user of mobile terminal 110. Speaker 130 may be located anywhere on mobile terminal 110 and may function, for example, as an earpiece when a user communicates using mobile terminal 110. Speaker 130 may include several speaker elements provided at various locations within mobile terminal 110. Speaker 130 may also include a digital to analog converter to convert digital signals into analog signals. Speaker 130 may also function as an output device for a ringing signal indicating that an incoming call is being received by communication device 110. Additionally, speaker 130 may function as an output device for audible alerts indicating receipt of text or multimedia messages, emails, or instant messages, as well as alerts indicating occurrence of reminders or the like. As will be described in additional detail below, audio content output from speaker 130 may be selected or identified by mobile terminal 110.

Display 140 may include a device that provides visual images to a user. For example, display 140 may provide graphic information regarding incoming/outgoing calls, text messages, games, phonebooks, the current date/time, volume settings, etc., to a user of mobile terminal 110. Implementations of display 140 may be implemented as black and white or color flat panel displays.

Microphone 150 may include a device that converts speech or other acoustic signals into electrical signals for use by mobile terminal 110. Microphone 150 may also include an analog to digital converter to convert input analog signals into digital signals. Microphone 150 may be located anywhere on mobile terminal 110 and may be configured, for example, to convert spoken words or phrases into electrical signals for use by mobile terminal 110.

Figure 2:
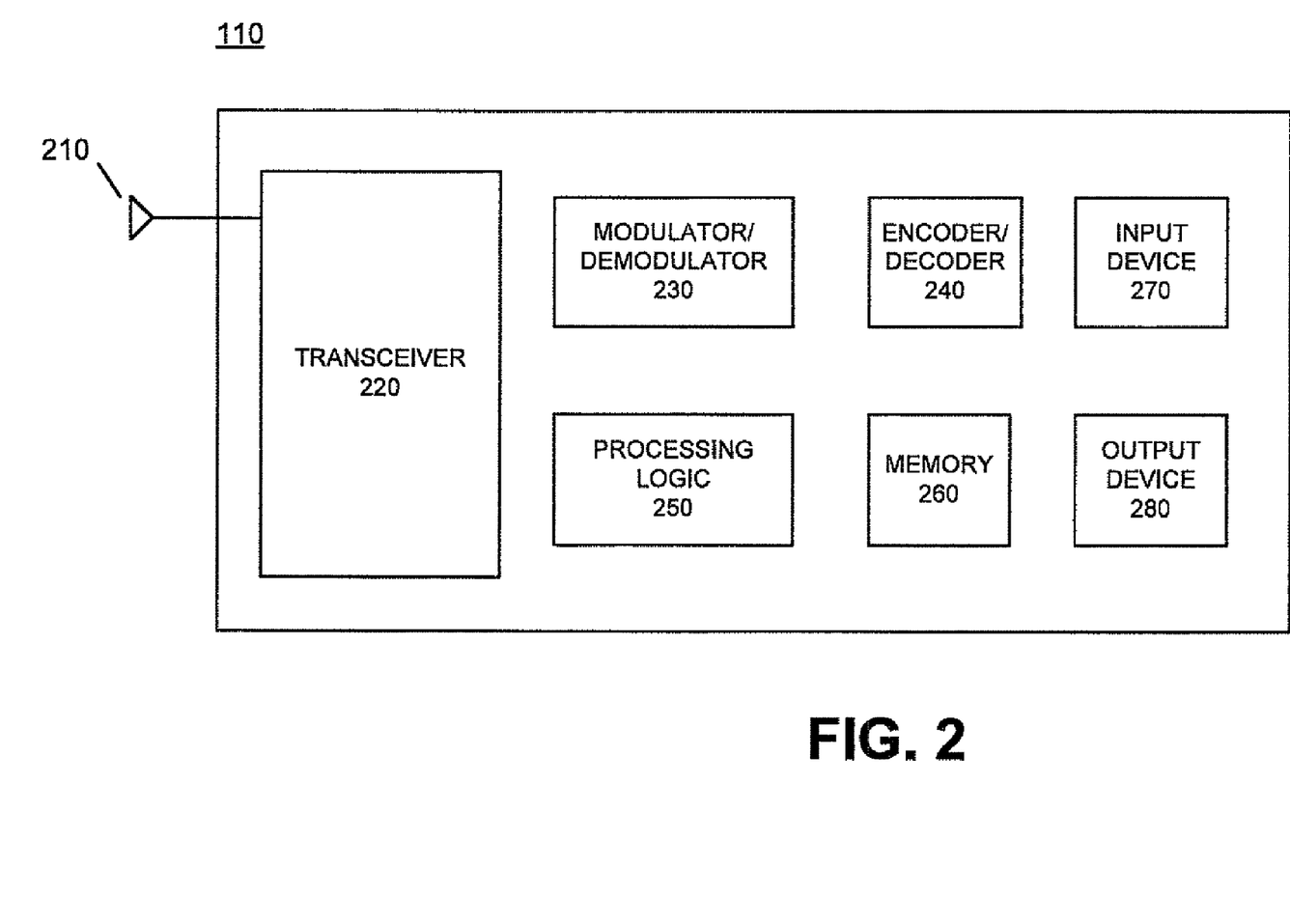
FIG. 2 is a diagram illustrating additional details of the mobile terminal shown in FIG. 1.

FIG. 2 is a diagram illustrating additional exemplary details of mobile terminal 110. Mobile terminal 110 may include a radio frequency (RF) antenna 210, transceiver 220, modulator/demodulator 230, encoder/decoder 240, processing logic 250, memory 260, input device 270, and output device 280. These components may be connected via one or more buses (not shown). In addition, mobile terminal 110 may include one or more power supplies (not shown). One skilled in the art would recognize that the mobile terminal 110 may be configured in a number of other ways and may include other or different elements.

RF antenna 210 may include one or more antennas capable of transmitting and receiving RF signals. In one implementation, RF antenna 210 may include one or more directional and/or omni-directional antennas. Transceiver 220 may include components for transmitting and receiving information via RF antenna 210. In an alternative implementation, transceiver 220 may take the form of separate transmitter and receiver components, instead of being implemented as a single component.

Modulator/demodulator 230 may include components that combine data signals with carrier signals and extract data signals from carrier signals. Modulator/demodulator 230 may include components that convert analog signals to digital signals, and vice versa, for communicating with other devices in mobile terminal 110.

Encoder/decoder 240 may include circuitry for encoding a digital input to be transmitted and for decoding a received encoded input. Processing logic 250 may include a processor, microprocessor, an application specific integrated circuit (ASIC), field programmable gate array (FPGA) or the like. Processing logic 250 may execute software programs or data structures to control operation of mobile terminal 110. Memory 260 may include a random access memory (RAM) or another type of dynamic storage device that stores information and instructions for execution by processing logic 250; a read only memory (ROM) or another type of static storage device that stores static information and instructions for use by processing logic 250; and/or some other type of magnetic or optical recording medium and its corresponding drive. Instructions used by processing logic 250 may also, or alternatively, be stored in another type of computer-readable medium accessible by processing logic 250. A computer-readable medium may include one or more memory devices.

Input device 270 may include any mechanism that permits an operator to input information to mobile terminal 110, such as microphone 150 or keypad 115. Output device 280 may include any mechanism that outputs information to the operator, including display 140 or speaker 130. Output device 280 may also include a vibrator mechanism that causes mobile terminal 110 to vibrate.

Mobile terminal 110 may perform processing associated with, for example, operation of the core features of mobile terminal 110 or operation of additional applications associated with mobile terminal 110, such as software applications provided by third party software providers. Mobile terminal 110 may perform these operations in response to processing logic 250 executing sequences of instructions contained in a computer-readable medium, such as memory 260. It should be understood that a computer-readable medium may include one or more memory devices and/or carrier waves. Execution of sequences of instructions contained in memory 260 causes processing logic 250 to perform acts that will be described hereafter. In alternative embodiments, hard-wired circuitry may be used in place of or in combination with software instructions to implement processes consistent with the invention. Thus, implementations consistent with the invention are not limited to any specific combination of hardware circuitry and software.

Exemplary Processing

Figure 3:
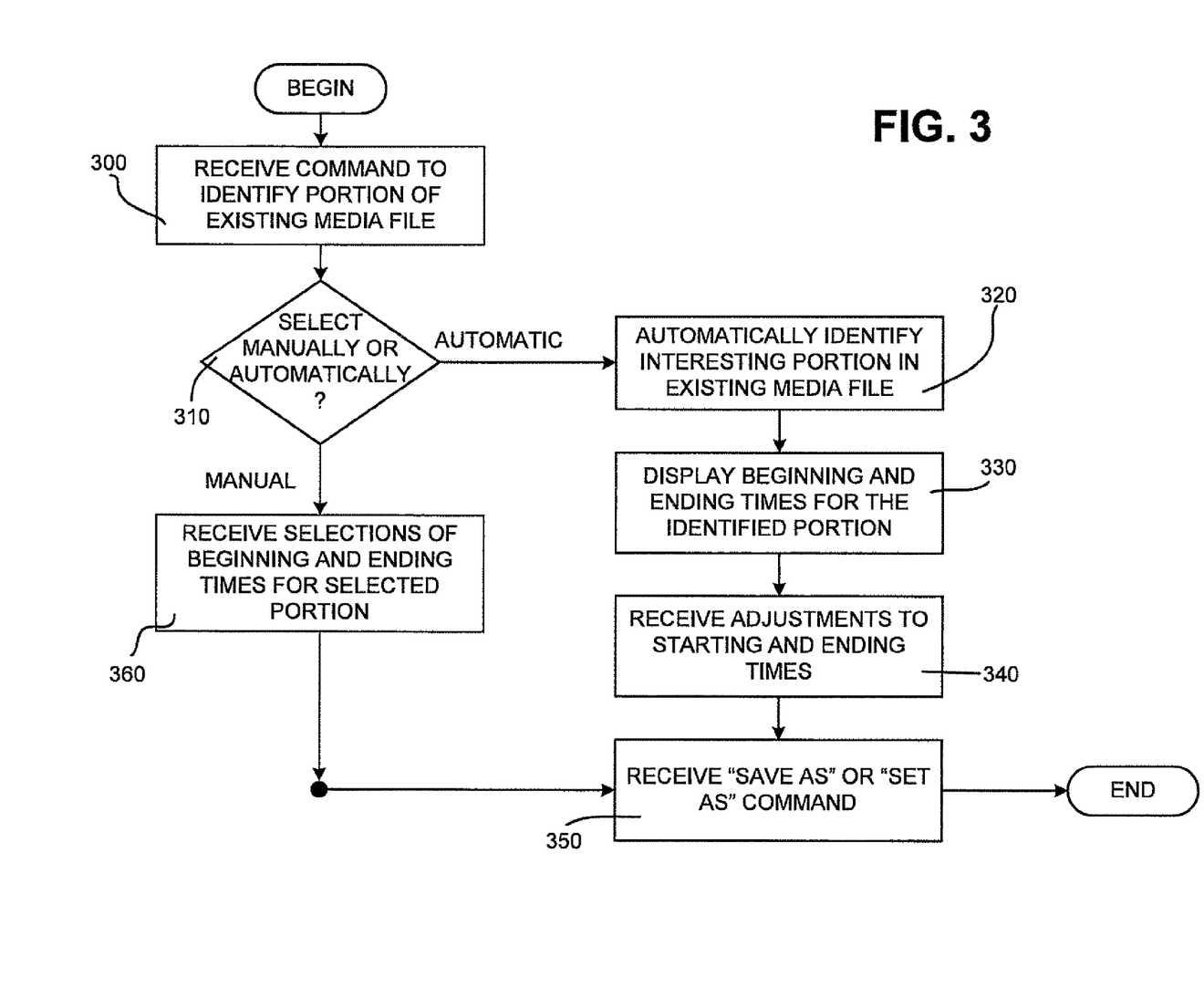
FIG. 3 is a flow chart illustrating exemplary operations of the mobile terminal of FIG. 2 in receiving audio output manipulation commands based on perceived motion of the mobile terminal.

FIG. 3 is a flow chart illustrating exemplary operations of mobile terminal 110 in identifying and configuring portions of existing media files for subsequent use as audible or visual alerts, ring tones, display backgrounds, video caller identification elements, etc. Suitable media files may include audio files, video files, animation files, or other multimedia files. Exemplary audio files may include those encoded using various audio formats, such as mp3 (mpeg-3 layer 2), wma (windows media audio), ogg (Ogg Vorbis), aac (advanced audio codec), flac (free loss audio codec), etc. Exemplary video files may include those encoded using various video formats, such as mp4 (mpeg-4), 3gp (third generation project), wmv (windows media video), mov (Apple Quicktime), Divx, xvid, avi (audio video interleave), etc. Exemplary animation files may include scalable vector graphics (SVG) or flash multimedia files (SWF or FLM).

Processing may begin with mobile terminal 110 receiving a command to identify a portion of an existing media file (block 300). For example, during playback of an audio or multimedia file, such as a popular song, mobile terminal 110 may receive a "set alert/tone portion" command or other suitable instruction. In addition to ring tones, a similar "set video portion" command may be received during playback of a video file, an animation file, or other multimedia file.

Alternatively, media selections may be initiated in instances outside of a playback environment. For example, while providing ring tone or alert management, mobile terminal 110 may receive a command to identify or set a new ring tone or alert based on an identified existing media file. Similarly, while providing background or photo caller ID management, mobile terminal 110 may receive a command to identify or set a display element (such as a wallpaper or screensaver) or photo caller ID element based on the identified existing media file.

Figure 4:
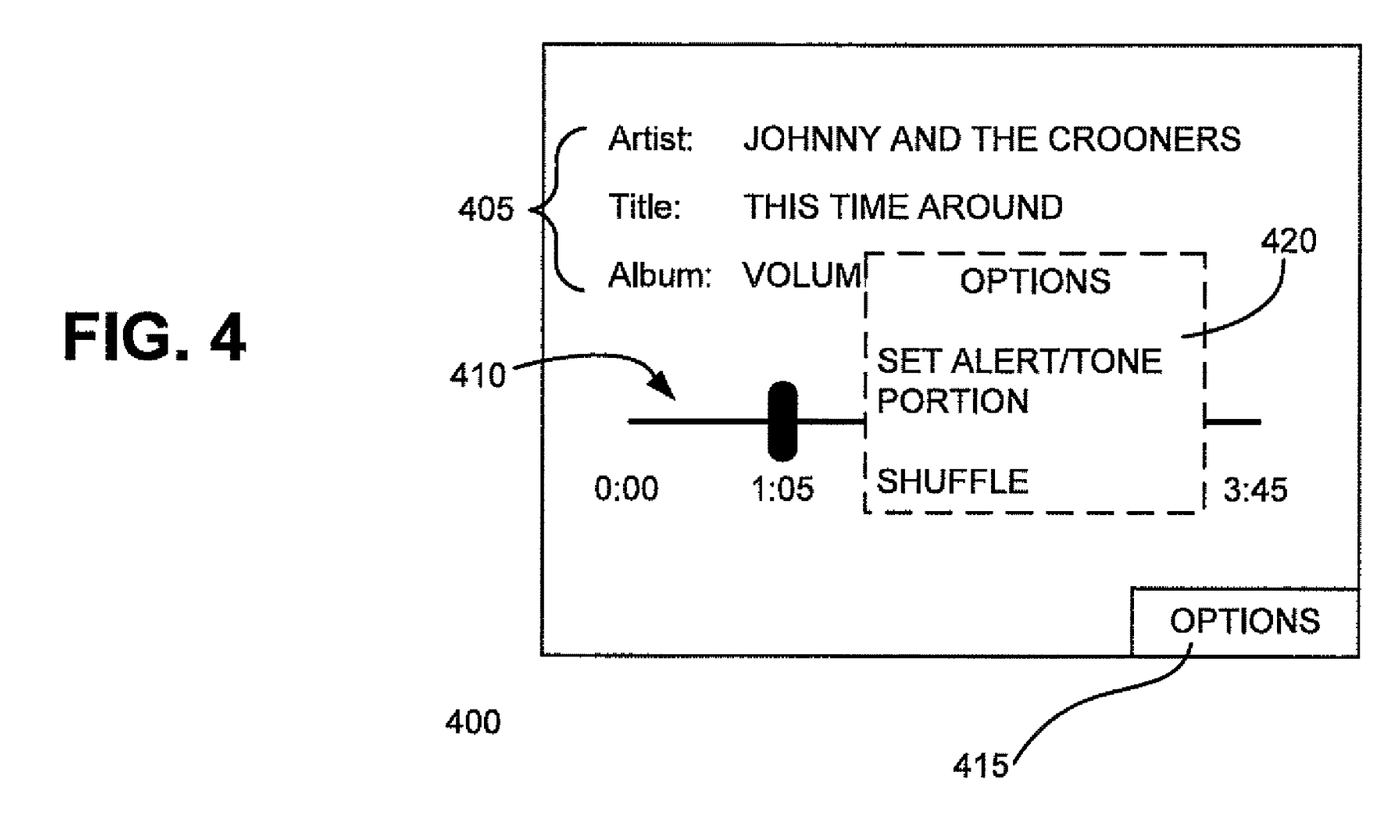
FIGS. 4-6 are diagrams illustrating exemplary user interfaces for the electronic device of FIG. 1.

FIG. 4 is a diagram illustrating one exemplary user interface 400 provided on display 140 during playback of a media file. Consistent with aspects described herein, interface 400 may include file information 405, such as artist, title, and alum information, and a playback indicator 410 indicating a total duration of the file as well as the current playback location within the file. An "options" element 415 may be provided in proximity to one of control keys 120 indicating that selection of the respective control key 120 results in an options menu 420 being provided within display 140. As illustrated, options menu 420 may include a "set alert/tone portion" element therein, the selection of which by manipulation of control keys 120 may trigger the following processing.

Upon receipt of the command to configure or identify a portion of the existing media file, mobile terminal 110 may determine whether the user wishes to identify or select a portion of the media file manually or automatically (block 310). In one implementation, mobile terminal 110 may be configured to initially automatically identify a portion (e.g., a specific 10 second selection) of the existing media file. The automatically identified media portion may then be manually adjusted by a user. Alternatively, no default media selection may be made, thereby requiring that a user manually select a portion of the media file, or alternatively, request automatic identification of a media selection.

In the event that an automatic media selection is requested (block 310-AUTOMATIC), either by default, or by user selection, processing logic 250 may analyze the existing media file for a portion that may be identifiable or interesting to the user (block 320). For example, processing logic 250 may identify a chorus or "hook" portion within the existing media file. In one implementation, the hook portion may be identified by examining repetitive or substantially repetitive portions of the existing media file.

Following identification of an identifiable or interesting portion of the exiting media file, mobile terminal 110 may display an indication of the beginning and ending times of the identified portion to the user (block 330). Mobile terminal 110 may receive adjustments to the identified portion (block 340). For example, a user may review or playback the automatically identified portion of the media file and may determine that it begins too early or too late, ends too early or too late, is too long, etc. The user may then adjust the beginning and ending times of the identified portion as desired.

In one implementation, users may adjust the beginning and ending times using a combination of control keys 120 and keypad 115 in conjunction with user interface elements presented on display 140. Alternatively, display 140 may include a touch screen display capable of receiving direct user interaction with the user interface elements presented thereon.

Mobile terminal 110 may then receive a "save as" or "set as" command, indicating that the user wishes to save the identified portion for subsequent use or set the identified portion to an identified function, such as a ring tone, alert, etc. (block 350). In on implementation, processing of the "save as" or "set as" command may include receiving a name for the identified portion. By identifying a portion of an existing media file, rather than manipulating and/or generating a new media file, any existing media file or media technology may be used. For example, a portion of a popular song may be dynamically played back as a ring tone during an incoming call. In particular, identified portions of copy protected or digital rights managed media, such as songs, movies, television shows, etc. may be used as alerts, ring tones, etc., where manipulation or editing of the protected file may be otherwise restricted.

Figure 5:
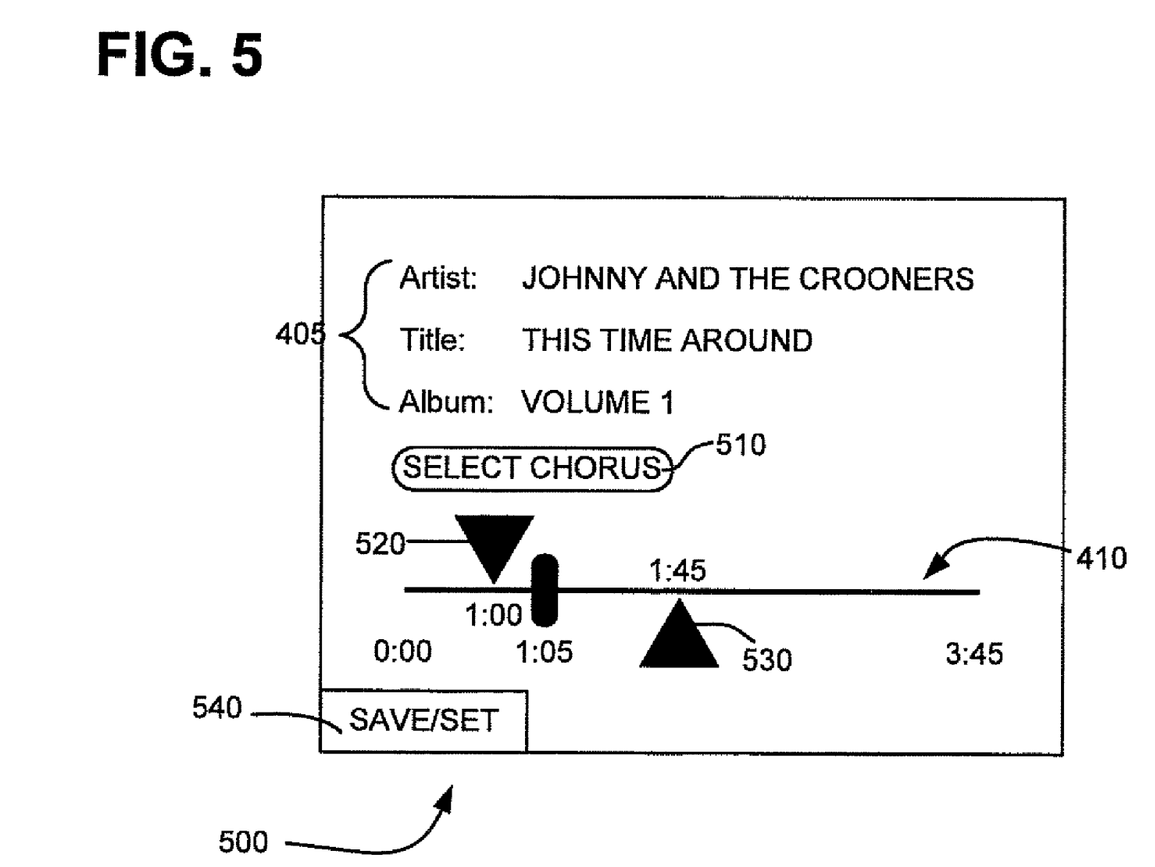

FIG. 5 is a diagram illustrating one exemplary user interface 500 provided on display 140 following receipt of a set media portion command. As illustrated, interface 500 may include a "select chorus" option 510, a beginning selection element 520 and an ending selection element 530 associated with playback indicator 410. Following automatic selection of a portion of the existing media file, the beginning and ending selection elements 520 and 530 may be positioned at the beginning and ending locations, respectively, of the identified portion. In interface 500, the identified portion may begin at 1:00 and may end at 1:45 of the existing media file. Users may interact with beginning and ending selection elements 520 and 530 to adjust the beginning and ending times of the identified portions. Interface 500 may further include a "SAVE/SET" element 540. Upon selection of "SAVE/SET" element 540, mobile terminal 110 may enable saving of the identified portion for subsequent use or, alternatively, assigning of the identified portion to an identified function, such as a ring tone, alert, called ID, etc.

In the event that automatic identification is not selected (either by default or upon explicit user request), mobile terminal 110 may receive starting and ending times identifying a selected portion of the existing media file (360). For example, a user may, during review or playback of the media file, identify and select a beginning time and an ending time for the selection portion of the media file. Alternatively, mobile terminal 110 may receive explicit indications of a starting time and an ending time for the selected portion. Using the example of FIG. 5, mobile terminal 110 may receive user interactions with beginning selection element 520 and ending selection element 530 designating a selection portion of the existing media file. Following manual selection of beginning and ending times, processing may continue to block 350 described above, for receipt of a save/set command.

Figure 6:
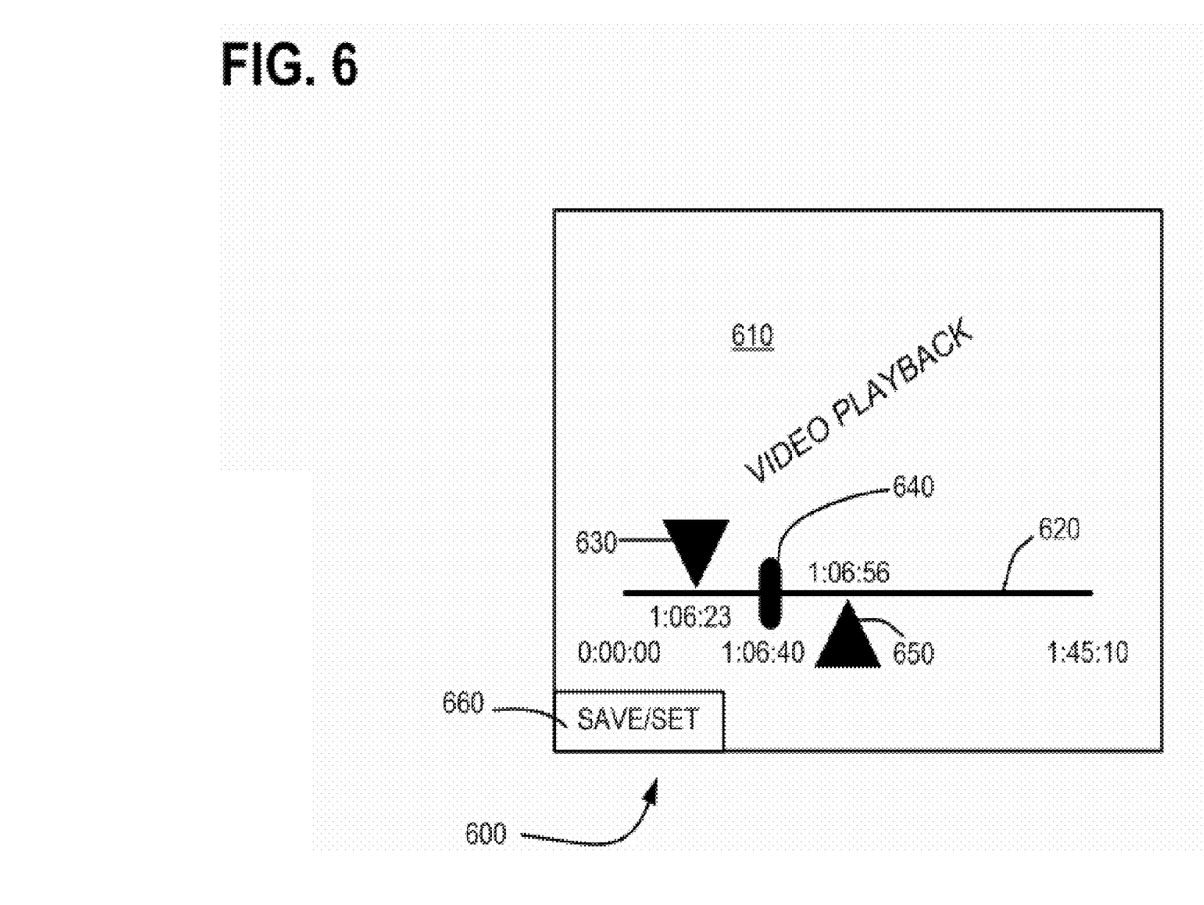

FIG. 6 is a diagram illustrating one exemplary user interface 600 provided on display 140 following receipt of a set media portion command relating to an existing video, animation, or multimedia file. As illustrated, interface 600 may include a video/animation playback area 610, a playback indicator 620, a beginning selection element 630, a current location element 640, and an ending selection element 650. Video playback area 610 may provide for display or playback of the existing video or multi-media file. Playback indicator 620 and current location indicator may indicate a presently displayed portion of the selected file. As described above with respect to FIG. 5, beginning selection element 630 and ending selection element 650 may be manipulated to identify a selected portion of the media file to be saved or assigned for subsequent use. In interface 600, the identified portion of the video or multi-media file may begin at 1:06:23 and may end at 1:06:56. Interface 600 may further include a "SAVE/SET" element 660. Upon selection of "SAVE/SET" element 660, mobile terminal 110 may enable saving of the identified portion for subsequent use or, alternatively, assigning of the identified portion to an identified function, such as a background wallpaper, screensaver, photo caller ID, etc.

Figure 7:
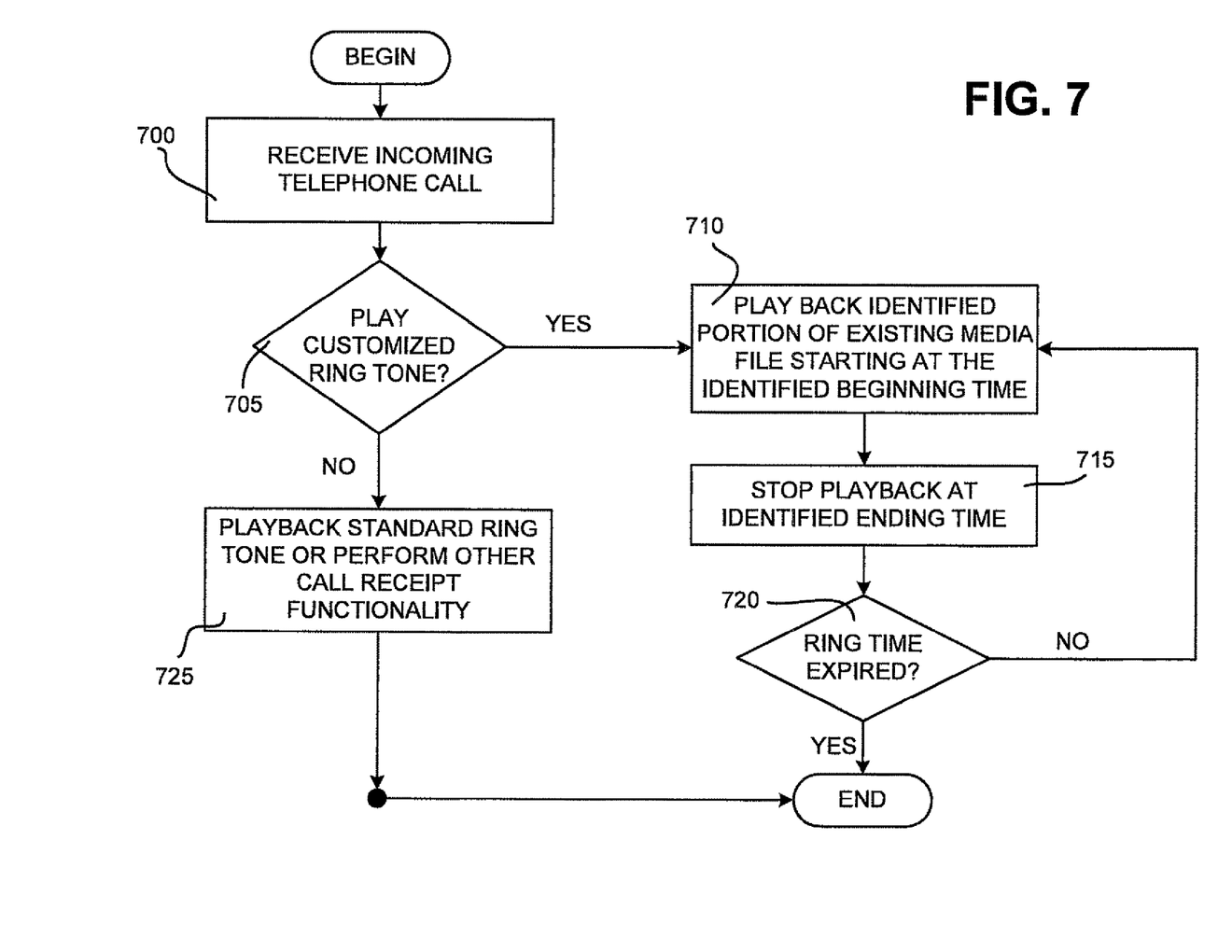
FIG. 7 is a flow chart illustrating exemplary operations of the mobile terminal of FIG. 1 in using an identified portion of an existing media file as a ring tone.

FIG. 7 is a flow chart illustrating exemplary operations of mobile terminal 110 in using an identified portion of an existing media file as a ring tone. Processing may begin with mobile terminal 110 receiving an incoming telephone call (block 700). Mobile terminal may determine whether a customized ring tone associated with the identified portion is to be played in response to the incoming telephone call (block 705). In some implementations, different ring tones may be assigned to different types of calls or callers.

If it is determined that the customized ring tone associated with the identified portion is to be played in response to the incoming telephone call (block 705-YES), mobile terminal 110 may play back the existing media file via speaker 130 beginning at the beginning time associated with the identified portion (block 710). Mobile terminal 110 may stop play back of the existing media file at the ending time associated with the identified portion (block 715). It may then be determined whether a predetermined ring time has expired (e.g., 30 seconds, etc.) (block 720). If not (block 720-NO), the process returns to block 710 for repeat playback of the identified portion. If a predetermined ring time has expired (block 720-YES), the process may end and no additional playback may be performed.

If it is determined that the customized ring tone associated with the identified portion is not to be played in response to the incoming telephone call (block 705-NO), mobile terminal 110 may play back a standard ring tone or may perform any other call alert functionality associated with mobile terminal 110, such as vibrating, flashing lights, etc. (block 725). It should be understood that playback of the identified portion of the existing media file may be aborted by user interaction with mobile terminal 110, such as by answering the call, sending the caller to voicemail, silencing mobile terminal 110, or the like.

CONCLUSION

As described above, beginning and ending times of a portion of an existing media file may be identified and saved to enable use of the identified portion as an alert, ring tone, desktop wallpaper, photo caller ID, etc. By identifying a portion of an existing media file, rather than manipulating and/or generating a new media file, any existing media file or media technology may be used.

The foregoing description of the embodiments of the invention provides illustration and description, but is not intended to be exhaustive or to limit the invention to the precise form disclosed. Modifications and variations re possible in light of the above teachings or may be acquired from practice of the invention.

Further, while a series of acts has been described with respect to FIGS. 3 and 7, the order of the acts may be varied in other implementations consistent with the invention. Moreover, non-dependent acts may be performed in parallel.

It will also be apparent to one of ordinary skill in the art that aspects of the invention, as described above, may be implemented in cellular communication devices/systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. An automated method, comprising:
   automatically identifying, by a mobile communications device, a portion of an existing media file in the mobile communications device, the identified portion comprising a repetitive or substantially repetitive portion of the existing media file;
   receiving, by the mobile communications device, an incoming call; and
   playing back, by the mobile communications device, the identified portion of the existing media file in response to the received incoming call.

2. The automated method of claim 1, where the identified portion of the existing media file includes a starting time identification and an ending time identification.

3. The automated method of claim 1, where the identified portion includes one of a starting time identification or an ending time identification.

4. The automated method of claim 1, where the existing media file comprises a digital rights managed media file.

5. The automated method of claim 1, where the existing media file is protected by digital rights management.

6. The automated method of claim 1, where the existing media file comprises one of an audio file, a video file, an animation file, or a multimedia file.

7. The automated method of claim 1, where the identified portion of the existing media file comprises a chorus portion of the existing media file.

8. An automated method, comprising:
   automatically identifying, by a mobile communications device, a portion of an existing media file, said identifying comprising examining a repetitive or substantially repetitive portion of the existing media file;
   assigning, by the mobile communications device, the identified portion to an action; and
   playing back, by the mobile communications device, the identified portion of the existing media file in accordance with the assigned action.

9. The automated method of claim 8, where the action comprises one of: receipt of an incoming call, receipt of an incoming message, execution of an alert, execution of a reminder, display of a background, display of a screensaver, or display of a caller identification element.

10. The automated method of claim 8, where identifying a portion of an existing media file further comprises:
    identifying a starting time within the existing media file; and
    identifying an ending time within the existing media file.

11. The automated method of claim 8, where identifying a portion of an existing media file further comprises:
    setting a starting time for the portion of the existing media file to a starting time of the automatically determined identified portion; and
    setting an ending time for the portion of the existing media file to an ending time of the automatically determined identified portion.

12. The automated method of claim 11, further comprising:
    receiving adjustments to one of the starting time for the portion of the existing media file or the ending time for the portion of the existing media file.

13. A mobile device, comprising:
    a display;
    a speaker;
    a memory to store an existing media file; and
    a processor to:
       analyze the existing media file to identify a repetitive or substantially repetitive portion of the existing media file;
       assign the identified portion to performance of an action associated with the mobile device; and
       output the identified portion of the existing media file via at least one of the display or the speaker in response to an executed command associated with performance of the action.

14. The mobile device of claim 13, where the processor is further to output a representation of the identified portion of the existing media file to the display.

15. The mobile device of claim 13, where the processor is further to receive adjustments to the identified portion of the existing media file.

16. The mobile device of claim 13, where the action comprises a ring tone playback command generated in response to a received call.

17. The mobile device of claim 13, where the action comprises a message alert playback command generated in response to a received message.

18. The mobile device of claim 13, where the mobile device comprises a portable communications device.

19. A portable communications device, comprising:
    means for outputting audio and video;
    means for storing a media file;
    means for identifying a portion of the stored media file, the indentified portion comprising a repetitive or substantially repetitive portion of the existing media file;
    means for assigning the identified portion to an event; and
    means for outputting the identified portion of the stored media file in response to the assigned event.

20. The portable media device of claim 19, where the identified portion of the stored media file comprises less than an entirety of the stored media file.

* * * * *